United States Patent
Mace et al.

(10) Patent No.: US 7,567,043 B2
(45) Date of Patent: Jul. 28, 2009

(54) METHOD OF SERVO CONTROLLING THE SPEED OF AN ELECTRIC MOTOR ON START-UP, AND APPARATUS IMPLEMENTING THE SYSTEM

(75) Inventors: Philippe Mace, Rennes (FR); Luc Roux, Severac (FR); Gérard Corda, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 241 days.

(21) Appl. No.: 11/725,833

(22) Filed: Mar. 20, 2007

(65) Prior Publication Data

US 2008/0007194 A1   Jan. 10, 2008

(30) Foreign Application Priority Data

Mar. 31, 2006   (FR) .................................. 06 51153

(51) Int. Cl.
*H02P 1/04* (2006.01)
(52) U.S. Cl. ..................... 318/362; 318/369; 318/560; 318/460; 318/461
(58) Field of Classification Search ............... 318/362, 318/560, 369, 460, 461; 369/44.27
See application file for complete search history.

(56) References Cited

U.S. PATENT DOCUMENTS

| | | | |
|---|---|---|---|
| 4,605,888 A | | 8/1986 | Kim |
| 4,679,181 A | * | 7/1987 | Naito ..................... 369/44.27 |
| 5,892,742 A | * | 4/1999 | Yamashita et al. ....... 369/44.27 |
| 5,896,354 A | * | 4/1999 | Yamashita et al. ....... 369/44.34 |
| 5,901,121 A | * | 5/1999 | Yamashita et al. ....... 369/44.28 |
| 5,933,397 A | * | 8/1999 | Yamashita et al. ....... 369/44.28 |
| 6,979,976 B2 | * | 12/2005 | Tachibana .............. 318/400.09 |

FOREIGN PATENT DOCUMENTS

| JP | 55 034825 A | 3/1980 |
|---|---|---|
| JP | 58 003582 A | 1/1983 |
| JP | 2001 037274 A | 2/2001 |

OTHER PUBLICATIONS

Search report dated Nov. 29, 2006.

* cited by examiner

*Primary Examiner*—Rita Leykin
(74) *Attorney, Agent, or Firm*—Robert D. Shedd; Jeffrey M. Navon

(57) ABSTRACT

The present invention discloses a method of servo controlling an electric motor during its start-up, comprising at least one step of measuring the speed after a determined duration counting from the commencement of start-up. During a first start-up, the servo control system determines the deviation between the value of the measured speed and a preset value. During a second start-up, the servo control system modifies at least one duration parameter of the commands applied to the motor as a function of the deviation determined during the first start-up, so as to reduce this deviation in the course of this second step. Advantageously, the start-up comprises three phases making it possible to start the motor while avoiding making it too noisy. The invention also relates to an apparatus implementing the method.

16 Claims, 3 Drawing Sheets

METHOD OF SERVO CONTROLLING THE SPEED OF AN ELECTRIC MOTOR ON START-UP, AND APPARATUS IMPLEMENTING THE SYSTEM

This application claims the benefit, under 35 U.S.C. 119 of French Patent Application 06/51153, filed Mar. 31, 2006.

FIELD OF THE INVENTION

The present invention relates to a method of servo controlling the speed of an electric motor on start-up. The present invention also relates to an apparatus comprising a servo control system implementing the said method.

BACKGROUND

The new generations of decoders, in particular those dedicated to high definition, have to handle new video compression standards (such as MPEG4), demodulate DVB-S2 type signals for satellite reception and offers new functionalities by virtue of the presence of a hard disk. These new items of equipment give rise to an increase in the processing power which has to be achieved inside the apparatus and therefore the consumption of energy. Hence, the electronics contained in this new generation of decoders consumes more energy than contemporary decoders. This energy gives rise to an increase in temperature which, eventually, is prejudicial to the reliability of the integrated circuits and of the other sensitive elements such as chip cards and hard disk. To remedy this problem, a cooling system designed with the aid of fans which blow fresh air from the outside into the whole of the cavity of the decoder and which extract the heat are implemented in decoders.

A fan is disposed in proximity to the vents so as to accelerate the exchanges with the outside and improve cooling. But the use of a fan at full speed is noisy. If the apparatus is a television decoder for example, it may be placed in a bedroom. In this case, it must not disturb the sleep of the users, the maximum threshold usually allowed is twenty-five decibels.

To reduce the sound level, constructors controls the fan at a certain moment and modulates its speed as a function of a preset speed to be attained. A temperature probe is placed in a usually hot location of the apparatus representative of the various hot spots of the apparatus. As soon as a threshold is attained or exceeded, the fan is turned on and its speed depends on the deviation between this threshold and the temperature measured by the probe, or else always turned on at a low speed so long as a temperature threshold is not exceeded. Typically, the fan is set to idle during power-up of the apparatus, and as soon as the temperature exceeds 50° C., the speed of the fan accelerates. An improvement consists in defining several temperature thresholds and as a function of these thresholds in dispatching a certain control value. To control its effectiveness, the fan has a tachometer probe which emits a signal dependent on the actual speed of the blades. The fan control unit analyses the signals originating from a probe and ensures regulation of the internal speed of the apparatus. The regulation is performed by an auto-control of PDI type (P for proportional, D for differential and I for Integral and). This efficacious auto-control allows accurate regulation of the speed, by adjusting the command provided to the fan as a function of the values measured by the tachometer probe so as to attain a preset speed.

Measurements have shown that this device turned out to be noisy, especially at power-up. At this moment, the fan goes from a zero speed to a preset speed. It is important that start-up be progressive, or at least that the speed on start-up remain less than the steady-state preset speed, and that start-up not cause any oscillation, so as not to be too noisy. Tests have shown that if a start-up command of significant amplitude is not applied, the fan does not start and/or merely oscillates. However, prolonged application of the start-up command causes the actual speed of the fan to overshoot and renders its operation more audible, this being reinforced by the fact that thereafter it is necessary to slow the fan down in order for it to attain its preset speed, the slowing down is also audible.

This document JP 2001 037274-MURATA published on 9 Feb. 2001 describes an electric motor evidently controlled by pulsations (see the diagram). During a first power-up, initialization parameters are applied and the speed of the motor is measured. If the speed of the motor is below a preset speed, then the value of the voltage is increased. By repeating this operation several times until the preset value is attained, the desired speed is obtained. The voltage parameter is then saved for all subsequent power-ups.

Therefore, there is a necessity to modify the control value of the fan to reduce the variations of speed, and consequently the fan start-up noise.

SUMMARY OF THE INVENTION

The present invention relates to a method of servo controlling an electric motor during its start-up, comprising at least one step of measuring the speed after a determined duration counting from the commencement of start-up;
wherein it comprises
a first start-up comprising a step of determining the deviation between the value of the measured speed and a preset value,
a second start-up in the course of which at least one duration parameter is modified as a function of the deviation determined during a preceding start-up, so as to reduce this deviation in the course of this second step; said duration parameter relates to the duration in the course of which a command is applied to the motor.

In this way, measurements of the behavior of the motor that are performed during a preceding start-up will make it possible to improve the next start-up and make it possible to attain the preset speed more rapidly, the modification consisting in increasing or decreasing the value of at least one of the duration parameters.

According to a first improvement, the method comprises a step of start-up in the course of which a start-up control value is applied for a determined start-up duration. The start-up duration is modified so as to reduce this deviation in the course of the second start-up. According to another improvement, the method comprises a step of start-up in the course of which a start-up control value is applied for a start-up duration. The start-up value is modified so as to reduce this deviation in the course of the second start-up. According to another improvement, the method comprises a step termed "of continuity" subsequent to the step of start-up, the control value applied in the course of said step of continuity lies between the start-up value and the control value making it possible to attain the preset speed. According to another improvement, the method comprises a step termed "asymptotic" subsequent to a step of start-up and preceding a step of regulation where the speed of the motor is servo controlled. The control value applied in the course of this asymptotic step is equal to the control value making it possible to attain the preset speed. In this way, from one start-up to another, the system can adjust one or more parameters so as to reduce as far as possible the deviation between the value of the measured speed and a preset value.

According to another improvement, the parameters of the commands applied to the motor are modified only if the deviation determined during a preceding start-up is greater than a determined value. In this way, for tiny deviations, the correction is not applied, thus avoiding the consumption of calculation power. According to another improvement, the servo control method measures the oscillations of the speed of the motor executed at the commencement of a step of regulation where the speed of the motor is servo controlled. At least one parameter of the commands applied to the motor is modified when the amplitude of the oscillations exceeds a determined value. The modification of the parameter is aimed at reducing the amplitude of the oscillations in the course of the following start-up. In this way, it is possible to reduce the noise caused by possible oscillations. According to another improvement, the servo control method comprises a step of determining a minimum amplitude value by applying different control values during successive start-ups. The determined value is dependent on the minimum amplitude value. In this way, the system can diverge slightly without triggering a new phase of determination of optimum and thus mobilizing calculation time.

According to another improvement, the method comprises a step of measuring the temperature within the apparatus at the commencement of the start-up. The parameters of the commands applied to the motor are modified as a function of the measured temperature. In this way, the system takes into account the modifications of behavior of the fan during its start-up as a function of temperature. According to another improvement, the method also makes it possible to control the start-up of a second motor. The deviations between the value of the measured speed and a preset value for each motor are determined. The modification of the parameters is applied at each start-up alternately to each of the motors.

The present invention also relates to an apparatus furnished with at least one electric motor, with a means of controlling the speed of rotation of the motor and with a means of measuring the deviation between the speed of rotation of the motor measured at a given instant of the start-up of said motor and a preset speed, wherein the controlling means takes into account the measured deviation so as to modify at least one of the duration parameters of the commands applied to the motor during a subsequent start-up so as to reduce the deviation measured in the course of this start-up, said duration parameter relating to the duration in the course of which a command is applied to the motor.

BRIEF DESCRIPTION OF THE DRAWINGS

Other characteristics and advantages of the present invention will appear in the description of a preferential embodiment, this description being offered with reference to the appended drawings in which.

DETAILED DESCRIPTION OF THE INVENTION

Figure 1:
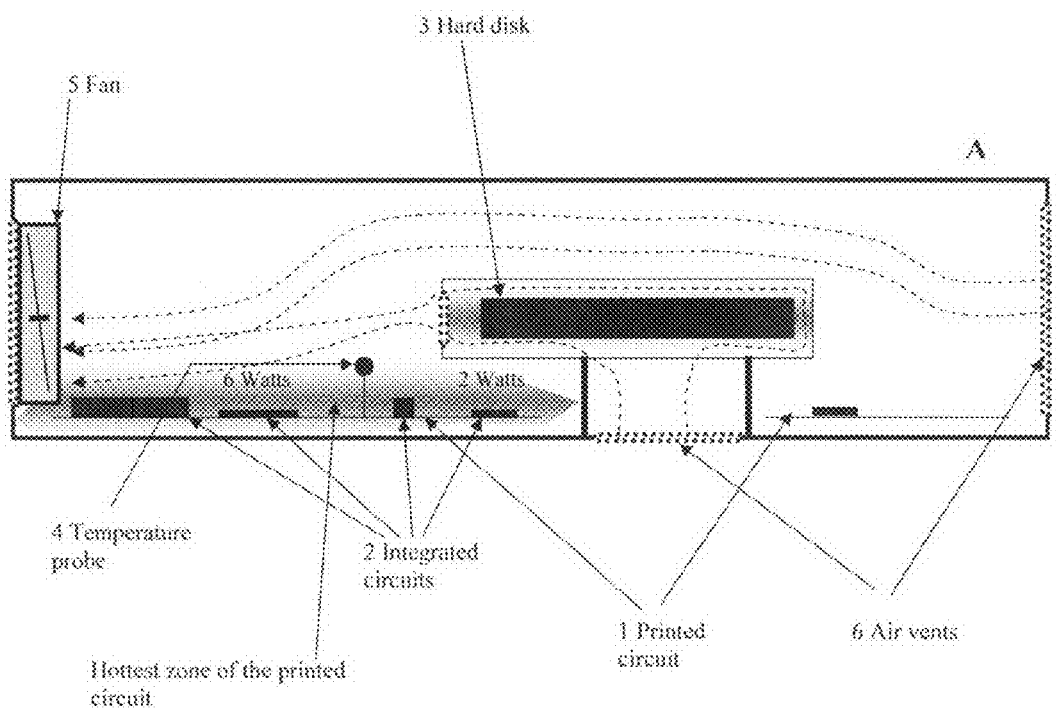
FIG. 1 represents a section through an electronic apparatus according to a preferred exemplary embodiment of the invention.

FIG. 1 describes in section an electronic apparatus A, a television decoder for example. The apparatus A comprises a printed circuit 1 on which electronic circuits 2 are disposed. A hard disk 3 makes it possible to store data, in particular audiovisual works of long durations. The circuits 2 and the disk 3 consume a great deal of energy and give off heat, for example, the central unit of the apparatus A releases about 6 watts of energy. A non-volatile memory, typically of EEPROM type is connected to the central unit. This memory allows the non-volatile storage of the data used during start-up. Certain zones of the apparatus A, marked in grey in FIG. 1, are hotter than others. A temperature probe 4 disposed within one of these hot zones, preferably in proximity to the circuit consuming the most energy, provides a voltage proportional to the temperature. A fan 5 extracts the hot air from the cavity of the apparatus A. Two ventilation vents 6 cut in the shell of the apparatus A allow two inlets for fresh air. Curved arrows show the passage of the air streams.

Figure 2:
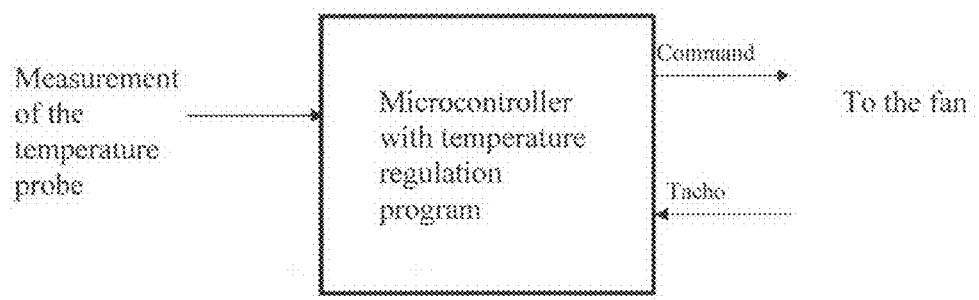
FIG. 2 illustrates a servo control system according to a preferred exemplary embodiment.

FIG. 2 illustrates a servo control system according to a preferred exemplary embodiment. This figure is applicable to any regulation system which, receiving a measurement value and as a function of a preset value, determines a control value. The temperature probe 4 and the fan 5 are connected to a management unit 7. The management unit can be a microcontroller dedicated to speed and temperature regulation. The management unit 7 can also be a part of the central unit. Whatever its nature, the management unit has at least an analogue input for the reception of the signals originating from the temperature probe 4, a digital input for the reception of the signals representative of the speed of the fan (these signals are generally called "Tacho") and a command output for the controlling of the fan 5. In the steady state, the microcontroller 7 determines, as a function of the measurement provided by the probe 4, the speed of the fan so as to create a fresh air stream sufficient to maintain the inside of the apparatus A below a nominal temperature.

In the exemplary embodiment, the fan is controlled by an analogue signal which directly defines the speed of rotation of the fan. Advantageously, the management unit 7 provides a PWM signal (acronym of "Pulse Width Modulator"). This is a periodic digital signal which, converted into an analogue signal by using a low-pass filter, makes it possible to control a motor. Its frequency is typically fixed and its duty ratio variable. This variation in duty ratio makes it possible to vary the amplitude of the analogue control signal of the motor. In the exemplary embodiment, the duty ratio of the PWM is coded on 8 bits and the motor control range, on this scale of PWM, is about 120 to 255. A variation of 1 unit of PWM is not therefore negligible, which explains why it is possible to hear such a variation. The analogue DC voltage typically applied varies between 0 and 12 volts, the useful range being 5 volts to 12 volts since below 5 volts, the fan does not start. The Tacho signal is a pulsed signal, the number of pulses per unit time determines the actual speed of the fan.

Measurements have demonstrated a correlation between a number of decibels and a given speed. This speed value is an intermediate parameter since the command actually dispatched to the fan is dependent on the servo control system. The sound volume measured stems from this speed value. For certain speed the noise seems well controlled, if we deviate from this speed, the noise is noticeably modified. Regulation controlling the motor directly as a function of temperature could ensure a constant temperature, but the variations in speed would be acoustically perceptible. The control of the fan is performed by a servo control system of PID type: as a function of the measured speed and of a preset value, the servo control system calculates a control value. The preset speed depends on the temperature measured in the apparatus A. Through tests conducted in the laboratory, the servo control system knows the maximum speed beyond which the noise generated by the fan exceeds the value audible to the users, typically this value is 25 decibels. At power-up, if the decoder is cold, the management system dispatches a minimum value to the fan, sufficient to rotate the fan, then the temperature increasing, the servo control system calculates a new value taking the temperature into account.

Let us take for example a control value corresponding to the preset speed of 120 out of 255. On start-up the application of such a value gives rise to an oscillation of the fan without rotation, in addition to the fact that it does not produce any air stream, this oscillation is noisy. It is necessary to apply a start-up control value of about 170 out of 255, so as ensure correct start-up of the fan.

The present invention will consist in studying how the fan behaves during a start-up, so as to modify the parameters of a subsequent start-up with a view to minimizing the noise generated.

Figure 3:
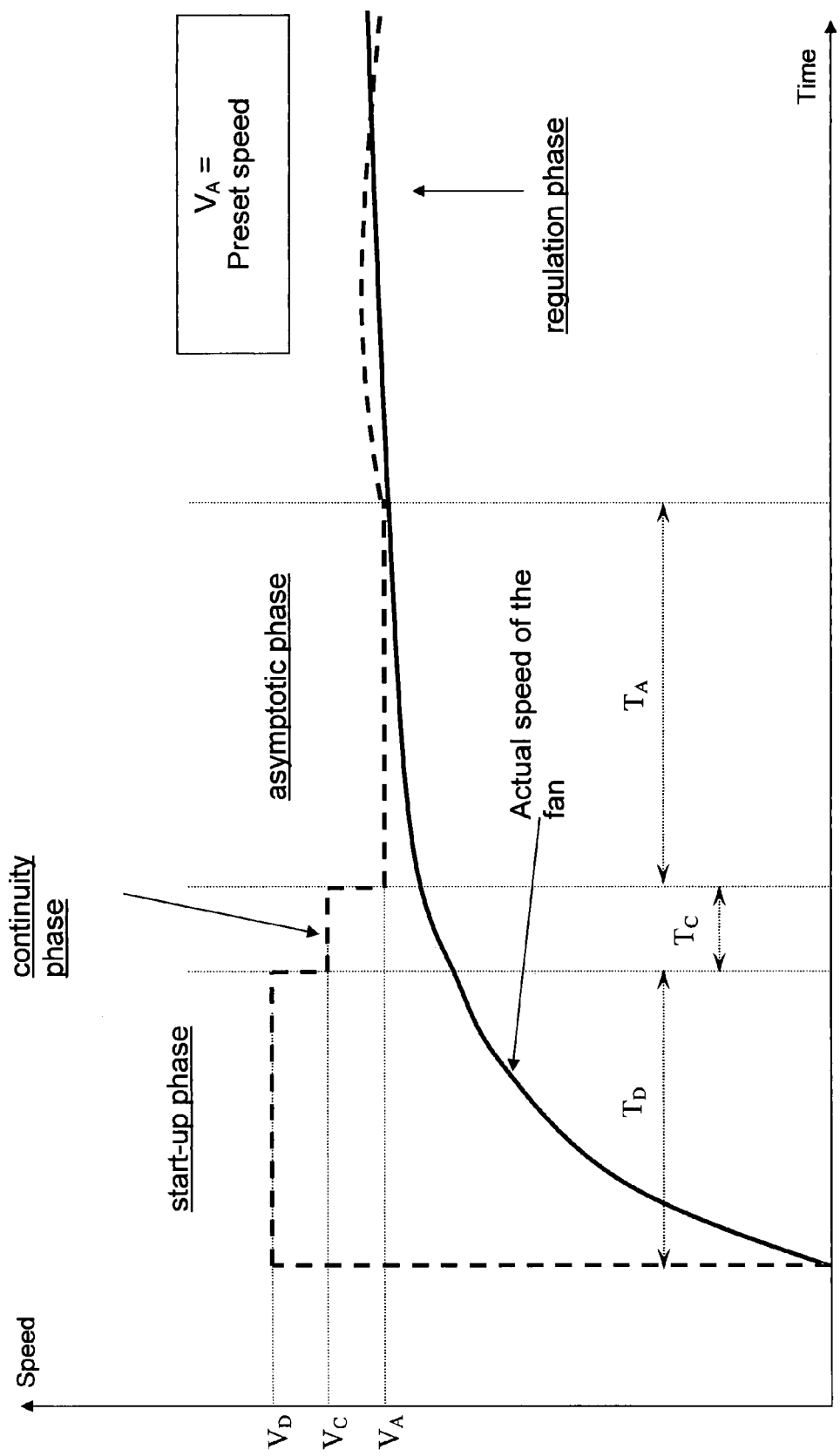
FIG. 3 is a time chart illustrating the various phases and the behavior of the fan.

FIG. 3 shows the various phases for starting the fan and bringing it to its preset speed. According to a simple embodiment, the system comprises a start-up phase followed by a regulation phase. In a more refined mode, two phases are added between the previously named phases: a continuity phase and an asymptotic phase. FIG. 3 illustrates the most refined mode with the four phases which will now be made explicit in a chronological manner. The three first phases are characterized by a constant control value at the fan, while the control value in the course of the regulation phase varies as a function of the deviation between the measured value and the preset value.

The start-up phase is characterized by a duration whose duration $T_D$ cannot be less than a determined duration $T_D$min and by a significant control value $V_D$. The start-up phase begins with the power-up of the fan. In the exemplary implementation of a fan in a decoder, the duration $T_D$ is nearly 800 milliseconds and the start-up control value lies between 170 out of 255 and 255, right from the instant that start-up is guaranteed thereat. These numbers are given for a 12-volt fan with a power of 0.5 Watts. The aim of this phase is to guarantee start-up of the fan. The duration of this phase will be adjusted, so as to obtain a minimum speed error at the moment at which regulation takes over.

The second phase, the continuity phase, is optional. It is characterized by a duration Tc greater than 100 milliseconds, and by a control value Vc intermediate between the start-up value Vd and the value making it possible to attain the preset speed in the steady state. According to a particularly simple example, the first value Vc, calculated during the manufacture of the apparatus, is the average of $V_D$ and of the control value making it possible to attain the preset speed. The aim of this phase is to avoid a discontinuity in the evolution of the speed. This discontinuity may make itself visible through a break in the speed curves at the transition between the start-up phase and the next one. By virtue of the continuity phase, the curve becomes gentler, making it possible to further decrease the noise.

The third phase, the asymptotic phase, is also optional. It is characterized by a fairly long duration $T_A$, typically 1000 milliseconds and by a control value $V_A$ equal to that of the control value making it possible to attain the preset speed: 128 for example. This phase is strongly advised since combined with the start-up phase, it affords a gentle and therefore noiseless transition to the regulation phase. This phase in fact allows the speed of the fan to approach that of the preset speed so that the regulation is performed thereafter with the least possible deviation and that the tangent of the speed curve at this point is very close to horizontality. At the end of this phase, the speed being close to the preset speed, the regulation will correct the speed only very slightly. In this way, the noise generated by the changes of speed is minimized.

The fourth phase is that termed regulation. It is characterized by the activation of a servo control system consisting in measuring the value of rotation of the motor and in modifying the control value so that the measured speed is the closest to the preset speed, sometimes called the "nominal value". Advantageously, the control value making it possible to attain the preset speed is that applied to the fan after a certain time in the course of the regulation phase, when the preset speed is attained and stabilization is achieved, that is to say when the integral, differential and proportional parts are frozen.

To summarize, the characteristics of the three phases are:
Start-up: value and duration significant so as to guarantee start-up,
Continuity: minimum duration so as to smooth the transition and avoid the noisy effect of a break, value lying between $V_D$ and the control value making it possible to attain the preset speed,
Asymptotic: duration long enough to draw near to the regulation phase with a low error and the lowest possible growth rate to ensure a gentle transition, value equal to the control value making it possible to attain the preset speed.

The corrections performed on the parameters must comply with the characteristics of each phase, the aim being that at the commencement of the regulation phase the error in the speed with respect to the preset speed is low.

Corresponding to each of the phases, the control module uses and modifies one or more of the six parameters:
$T_D$: duration of the start-up phase,
$V_D$: value applied in the course of the start-up phase,
$T_C$: duration of the continuity phase,
$V_C$: value applied in the course of the continuity phase,
$T_A$: duration of the asymptotic phase,
$V_A$: value applied in the course of the asymptotic phase.

During the manufacture of the apparatus A, the manufacturer initializes the EEPROM memory with default values. During the first power-up, these values are used by the control module of the fan. Advantageously, the default values are defined a minima, that is to say the corrections performed subsequently by the module will consist in increasing the values of durations or of commands to accelerate the time so that the fan attains the preset speed. Subsequently, the values recorded are modified as a function of the behavior of the fan measured by the tachometer probe.

After each power-up, the control module of the fan analyses the behavior of the fan by virtue of the measurements of the tachometer probe. The tachometer probe is connected to an internal counter of the central unit. The counter is incremented at each quarter of a revolution of the fan. The module measures the average speed of the fan between two measurements by calculating the deviation of the two counter values. According to a simple exemplary embodiment of the invention, the counter measurements are performed at the end of each of the start-up, continuity and asymptotic phases, thereafter during the regulation phase, the measurement is performed each second, for example. If a finer analysis of the behavior of the fan is desired and if time is available for the measurements, the module can perform measurements at regular intervals in the course of the first three phases, each 100 milliseconds typically. Decreasing the time intervals for the measurements makes it possible to approach instantaneous speed measurement.

According to a first embodiment, the speed values measured will cause the duration of at least one of the start-up, continuity or asymptotic phases to vary. At each start-up, the duration of the start-up phase can vary plus or minus according to a determined value "PAS". The value "PAS" is calculated in such a way that the variation in duration applied in the course of a determined phase causes a variation of one unit in the speed error measured at the end of the asymptotic phase. In this way, the variation from one start-up to another is not excessively significant. In the exemplary embodiment of a fan in a decoder, the value PAS is fixed at 5 milliseconds. The parameters of the continuity phase are adjusted as a function of the speed value measured, but only as a function of the control value making it possible to attain the preset speed.

According to the measured error, the servo control system varies at least one of the durations while complying with the conditions related to each phase. According to a preferred embodiment, the duration of the start-up phase varies as a function of the deviation $\Delta$ between the speed measured at the end of the asymptotic phase and the preset value. If at this moment, the deviation $\Delta$ is significant, the triggering of the regulation is at risk of giving rise to audible oscillations, this is why it is preferable to adjust the time of the start-up phase so that the speed at the end of the start-up phase is larger, and that the deviation $\Delta$ at the commencement of the regulation phase reduces. If the tachometer probe provides an instantaneous value of the speed, then the least deviation measured at the commencement of the regulation phase gives rise to a correction of at least one of the parameters of the first phases.

According to an exemplary implementation, the tachometer probe is connected to a counter; the value of the counter is read by the servo control system. The speed is calculated by dividing the deviation $(\Delta_i - \Delta_{i-1})$ between the last value and the one before last by the value of the last time interval. For example, if the tachometer probe delivers pulses at each quarter of a revolution of the fan, a preset speed can be 200 quarters of a revolution per second. According to this implementation, the measured speed is an average speed in the course of a given time range. Assume for example that, at the penultimate measurement, the instantaneous deviation is 6, and that at the last measurement which corresponds to the commencement of the regulation phase, the deviation is 0. Then, over the duration between these two measurements the deviation is 3, while ultimately the actual speed at the end of this duration is exactly the preset speed. It can be demonstrated therefore that the existence of a nonzero deviation does not necessarily imply that at the end of the asymptotic phase, the speed is not exactly that of the preset. It is therefore preferable to establish a threshold making it possible to trigger or otherwise the correction of parameters. The system compares the deviation between the speed measured and the preset speed with a threshold value S and if the deviation is not as large as S then the servo control system performs a correction. Typically for a fan implemented in a decoder with a preset speed of the order of 200 quarters of a revolution per second, the threshold S is 3 quarters of a revolution per second. So that if the deviation $\Delta$ between the speed measured at the commencement of the regulation phase and the preset speed is close to 3 quarters of a revolution per second, then no correction will be performed during the next start-up. The correction is performed in both directions so that if the deviation $\Delta$ is positive, that is to say the measured speed is less than the preset speed, then the correction will consist in adding the value PAS to the start-up duration. In the converse case, the value PAS will be deducted from the start-up duration. The threshold value is fixed in the laboratory as a function of the motor to be started and written into the EEPROM memory of the apparatus A.

According to an improvement, once a value $T_D$ has been determined so as to arrive at a tiny value of deviation at the commencement of the regulation phase, the system will search for the presence of oscillations subsequent to the junction between the steps which follow on the start-ups and the regulation phase. Specifically, the switch from a phase without regulation to a phase or the PID type regulation is fully operational may trigger oscillations. To measure the amplitude AMP of the oscillations, speed measurements are made in the course of the first seconds of the regulation phase so as to detect the presence and the amplitude of the oscillations. Typically, one measurement per second is made in the course of the first 16 seconds, for example. The absolute values of the deviations between the measured value and the preset value are added together. If the total which represents the amplitude AMP is greater than a determined value $AMP_{max}$ then the system will perform a correction step aimed at reducing this amplitude value.

Let us take a numerical example, this example uses values of instantaneous speed, that is to say measured without calculating the average over a period. Consider a control value of 128, a threshold value of 2 and a value $AMP_{max}$ of 20, subsequent to several start-ups, a speed of 126 is attained for a value $T_D$ of 810 ms, we are therefore in the bracket defined by the threshold value 2. Henceforth, the system instigates the measurement of the oscillations; the measured amplitude value is 32, which exceeds the threshold and therefore triggers a search step to look for an oscillation minimum.

The search step for a minimum of oscillations is based on a series of experimental measurements performed by the apparatus A. The servo control system applies different values of $T_D$ during each start-up, it calculates a new value AMP each time and finally it tests whether one of these values constitutes a minimum with respect to the others. The experimental determination of an optimum is performed according to known techniques.

Let us assume that in the course of a series of start-ups, the system measures the following values:

|  | $T_D$i | | | | |
| --- | --- | --- | --- | --- | --- |
|  | 815 ms | 810 ms | 800 ms | 795 ms | 785 ms |
| $\Delta$ measured | −1 | 0 | +1 | +2 | +3 |
| AMP measured | 45 | 38 | 24 | 15 | 26 |

From such a table, the system easily deduces that for the value $T_D$=795, the measurement at the commencement of the regulation phase is in the acceptable bracket and that the oscillations generated by the junction of the phases have a minimum amplitude. It is therefore this value $T_D$=795 which is chosen for the next start-ups. Advantageously, once the optimum has been determined, the value $AMP_{max}$ is recalculated. For example, the value $AMP_{max}$ is defined as being 1.5 times as large as the sum of the amplitudes measured when the system applies the control value which corresponds to the optimum. In this way, the system may diverge slightly without triggering a new phase of determination of optimum and thus mobilizing calculation time. It is only when the deviation becomes too significant (1.5 times in the example above) that a new correction is instigated.

In the course of the following start-ups, the system verifies that the value Δ is not greater than the threshold value S, and that the measured value AMP does not exceed the value $AMP_{max}$. In the converse case a new search step for an oscillation minimum is instigated.

According to another improvement, the parameters depend also on the temperature of the apparatus at power-up. The objective of the fan is to cool the inside of the apparatus A. Typically, the system defines three control values corresponding to three temperature ranges. The behavior of the fan varies as a function of temperature; depending on whether it is more or less hot, for one and the same control value Vi in the course of a duration Ti, the speed attained will not be the same. Typically when it is hot, for one and the same control value, the speed of the fan increases more or less rapidly. In order to take the temperature into account, the servo control system defines three temperature ranges. For each temperature range measured at power-up, the behavior of the fan is codified and the start-up is performed by using different parameters.

According to a simple exemplary embodiment, the control module reads from the EEPROM memory, the group of parameters corresponding to the temperature range measured on start-up. The data recorded in memory are contained in a table of the type below:

| Temperature | Group of parameters |
| --- | --- |
| Below 40° C. | $(T_{D1}, V_{D1}), (T_{C1}, V_{C1}), (T_{A1}, V_{A1})$ |
| From 40° C. to 50° C. | $(T_{D2}, V_{D2}), (T_{C2}, V_{C2}), (T_{A2}, V_{A2})$ |
| Above 50° C. | $(T_{D3}, V_{D3}), (T_{C3}, V_{C3}), (T_{A3}, V_{A3})$ |

The apparatus A possesses three groups of default values defined by the manufacturer, the control module thereafter modifying the group of parameters corresponding to the measured temperature. Advantageously, the temperature ranges of each group are the same as that for the temperature regulation of the apparatus. In this way, the preset value which depends on the temperature is also taken into account for the determination of the six start-up parameters.

A variant consists in keeping only a single group of parameters in memory and in associating it with a formula aimed at modifying one or more of the parameters as a function of the temperature measured on start-up. Initially, the system reads the parameter, and subsequently modifies it as a function of the temperature.

The constructor of the fan, or of the motor in general can transmit in the characteristics of the product, the curve of reactivity as a function of temperature. In the absence of such information, it is established in the laboratory. This step of determination consists in using a decoder, inside a temperature range and for a single target speed, and in calculating the list of the associations of values: temperatures value of the parameters, corrector coefficient. In the simple case or start-up is defined by only one parameter, for example the start-up duration $T_D$, it is possible to establish the curve $T_D=f(t°, V_{cons})$, where t° is the temperature and $V_{cons}$ the control value corresponding to the preset value of the fan. The function $f(t°, C_{cons})$ is advantageously of polynomial type of degree N. Tests have shown that an equation of degree 1 suffices as a first approximation, therefore the equation is $T_D=a \times t_i°+b$, the two coefficients of the polynomial are stored in E2PROM. During a next start-up, the system determines $V_{cons}$ and measures the temperature $t_i°$ so as to calculate the value $T_D$. For a more precise adjustment, an equation of degree 2 is preferable.

According to a variant embodiment, the management unit keeps the start-up duration constant and varies the start-up value applied to the fan when turned on. The control module analyses the speed value attained after a determined duration, and deduces there from whether it is necessary to increase, decrease or maintain this start-up value. The principle applied is the same as previously except that it is not the duration that the management system varies but the start-up value. This value can in no case be less than a minimum start-up value below which the rotation of the fan is not guaranteed. The two variants: that consisting in varying the duration and that consisting in varying the value may be combined.

Figure 4:
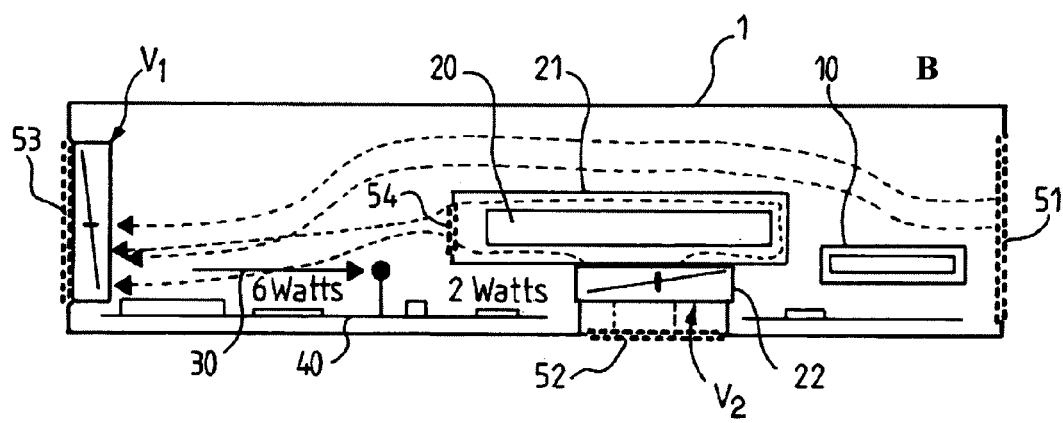
FIG. 4 is a diagrammatic view of an apparatus according to a particular exemplary embodiment of the present invention.

According to a particular exemplary embodiment, the decoder comprises two fans, namely a first fan V1 and a second fan V2. FIG. 4 illustrates this exemplary embodiment. The second fan V2 is dedicated to the hard disk 20 and makes it possible to inject fresh air originating from underneath the apparatus A, as represented by the dashes, and to dispatch it directly onto the hard disk 20 which is itself confined in a support 21 extended by a chimney 22 receiving said fan. The first fan V1 used for extraction is fixed to the left side of the chassis of the apparatus A1 seen face-on. This first fan extracts the energy dissipated in the decoder 1 by the electronic circuits used, such as processor, memory, demodulator, post regulation, supply, etc. By taking care to maintain a sufficient pressure in the decoder, the fan V1 used for extraction by taking fresh air from one side and by extracting it from the other side as represented by the dashes, avoids the need to channel the air stream as is the case for the fans blowing inside the chassis towards the elements to be cooled.

Figure 5:
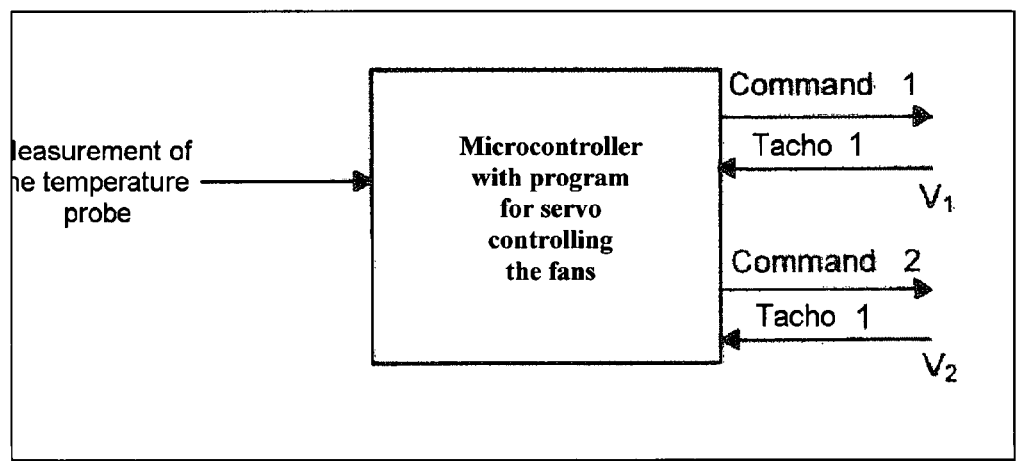
FIG. 5 is a diagrammatic view of the control circuit of the fans according to the particular exemplary embodiment of the present invention.

The same start-up principle applies to each of the fans, and the same management unit is used. The management unit according to this exemplary embodiment is illustrated by FIG. 5. The management unit possesses two PWM (Pulse Width Modulator) signal generators. The PWM signals emitted are converted into analogue signals by an integrator circuit. These analogue signals control the fans. The microcontroller also possesses 2 "Input Capture" inputs which make it possible to exactly meter the pulses triggered by each quarter of a revolution of each fan. The controlling of the fans by the same management unit makes it possible to accurately ascertain the sum of the noise produced by the two fans having regard to their respective speed of rotation, and thus to prevent the sum of the noise exceeding the admissible value. In certain cases, the management unit has just one "Input Capture" input, in this case the management unit links each tachometer input to the two contacts of a switch, the central contact being linked to an "Input Capture" input. According to this configuration, the speed of a single one of the fans can be analyzed at a time. In this case, during a first start-up, the speed of a fan is taken into account and a new duration is calculated for this first fan. Then during the second start-up, the second fan is taken into account. In this way, the values of one and of the other fan are alternately calculated and applied for the next turn-on. In this configuration it is advantageous to have a start-up in 3 phase+1 regulation phase before handing over to the other, which will do the same thing and thereafter the regulation phases will alternate. Specifically at the end of the regulation phase and with the method explained above, the speed is already sufficiently accurate to avoid a deviation amplified by the fact that the time before remeasurement of the speed is doubled with respect to the case where there is only one fan.

Those versed in the art will be able to adapt the present invention in numerous other specific forms without straying from the claimed field of application of the invention. In particular, the servo control system can adapt to the start-up of any electric motor whether or not it serves as fan. Consequently, the present embodiments must be considered by way of illustration but can be modified within the field defined by the scope of the attached claims.

The invention claimed is:

1. Method of servo controlling an electric motor during its start-up, comprising at least one step of measuring the speed after a determined duration counting from the commencement of start-up; wherein it comprises
   a first start-up comprising a step of determining the deviation between the value of the measured speed and a preset value,
   a second start-up in the course of which at least one duration parameter of the commands applied to the motor is modified as a function of the deviation determined during a preceding start-up, so as to reduce this deviation in the course of this second step; said duration parameter relating to the duration in the course of which a command is applied to the motor.

2. Method of servo controlling an electric motor according to claim 1; wherein each start-up comprises a step of start-up in the course of which a start-up control value is applied for a start-up duration, the start-up value being modified so as to reduce this deviation in the course of the second start-up.

3. Method of servo controlling an electric motor according to claim 2; wherein each start-up comprises a step termed "of continuity" subsequent to the step of start-up, the control value applied in the course of said step of continuity lying between the start-up value and the control value making it possible to attain the preset speed.

4. Method of servo controlling an electric motor according to claim 1; wherein it comprises a step termed "asymptotic" preceding a step of regulation where the speed of the motor is servo controlled, the control value applied in the course of said asymptotic step being equal to the control value making it possible to attain the preset speed.

5. Method of servo controlling an electric motor according to claim 1; wherein the duration parameters of the commands applied to the motor are modified only if the deviation determined during a preceding start-up is greater than a determined value.

6. Method of servo controlling an electric motor according to claim 1; wherein it comprises a step of measuring the oscillations of the speed of the motor in the course of a step of regulation during which the speed of the motor is servo controlled, at least one duration parameter of the commands applied to the motor being modified when the amplitude of the oscillations exceeds a determined value, the modification of the duration parameter being aimed at reducing the amplitude of the oscillations in the course of the following start-up.

7. Method of servo controlling an electric motor according to claim 1; wherein it comprises a step of measuring the temperature within the apparatus at the commencement of the start-up, the duration parameters of the commands applied to the motor during this start-up being likewise modified as a function of the measured temperature.

8. Method of servo controlling an electric motor according to claim 1; wherein it comprises start-ups performed by a second motor, and steps of determining the deviation between the value of the measured speed and a preset value for each motor, the modification of the duration parameters being applied at each start-up alternately to each of the motors.

9. Apparatus furnished with at least one electric motor, with a means of controlling the speed of rotation of the motor and with a means of measuring the deviation between the speed of rotation of the motor measured at a given instant of the start-up of said motor and a preset speed,
   wherein the controlling means takes into account the measured deviation so as to modify at least one of the duration parameters of the commands applied to the motor during a subsequent start-up so as to reduce the deviation measured in the course of this start-up, said duration parameter relating to the duration in the course of which a command is applied to the motor.

10. Apparatus according to claim 9; wherein the controlling means applies a start-up control value for a start-up duration, the start-up value being modified so as to reduce this deviation in the course of the second start-up.

11. Apparatus according to claim 9; wherein the controlling means applies a control value in the course of a duration termed "of continuity" subsequent to the start-up duration, the control value applied in the course of the continuity duration lying between the start-up value and the control value making it possible to attain the preset speed.

12. Apparatus according to claim 9; wherein the controlling means applies a control value in the course of duration termed "asymptotic" preceding a regulation duration where the speed of the motor is servo controlled, the control value applied in the course of said asymptotic duration being equal to the control value making it possible to attain the preset speed.

13. Apparatus according to claim 9; wherein the controlling means modifies the duration parameters of the commands applied to the motor only if the deviation determined during a preceding start-up is greater than a determined value.

14. Apparatus according to claim 9; wherein it comprises a means of measuring the oscillations of the speed of the motor in the course of a regulation duration for which the speed of the motor is servo controlled, the controlling means modifies at least one duration parameter of the commands applied to the motor if the amplitude of the oscillations exceeds a determined value, the modification of the duration parameter being aimed at reducing the amplitude of the oscillations in the course of the following start-up.

15. Apparatus (A) according to claim 9; wherein it comprises a means of measuring the temperature within the apparatus at the moment of the start-up of the motor, the controlling means modifying the duration parameters of the commands applied to the motor as a function of the measured temperature.

16. Apparatus (A) according to claim 9 comprising at least two motors; wherein the measurement means determines the deviation between the value of the measured speed and a preset value for each motor, the controlling means alternately modifying for each of the motors at least one of the duration parameters applied.

* * * * *